(12) United States Patent
Lai et al.

(10) Patent No.: US 8,266,718 B2
(45) Date of Patent: Sep. 11, 2012

(54) MODULATED MICROWAVE MICROSCOPY AND PROBES USED THEREWITH

(75) Inventors: Keji Lai, Menlo Park, CA (US); Michael Kelly, Portola Valley, CA (US); Zhi-Xun Shen, Stanford, CA (US)

(73) Assignee: The Board of Trustees of Leland Stanford Junior University, Stanford, CA (US)

( * ) Notice: Subject to any disclaimer, the term of this patent is extended or adjusted under 35 U.S.C. 154(b) by 91 days.

(21) Appl. No.: 12/706,190

(22) Filed: Feb. 16, 2010

(65) Prior Publication Data
US 2010/0218286 A1  Aug. 26, 2010

Related U.S. Application Data

(60) Provisional application No. 61/208,135, filed on Feb. 20, 2009.

(51) Int. Cl.
*G01Q 20/02* (2010.01)
*G01Q 60/00* (2010.01)
(52) U.S. Cl. .......................... 850/21; 850/30
(58) Field of Classification Search .............. 324/637; 250/234; 850/21, 63, 55, 6, 60
See application file for complete search history.

(56) References Cited

U.S. PATENT DOCUMENTS

| | | | | |
|---|---|---|---|---|
| 5,321,685 A | * | 6/1994 | Nose et al. | 369/126 |
| 5,488,305 A | * | 1/1996 | Bloom et al. | 324/537 |
| 5,796,102 A | * | 8/1998 | Van Kempen et al. | 850/27 |
| 5,838,005 A | * | 11/1998 | Majumdar et al. | 850/9 |
| 5,936,237 A | * | 8/1999 | van der Weide | 250/234 |
| 5,969,345 A | * | 10/1999 | Williams et al. | 250/234 |
| 6,265,711 B1 | * | 7/2001 | Kley | 250/234 |
| 6,353,219 B1 | * | 3/2002 | Kley | 250/234 |
| 6,383,823 B1 | * | 5/2002 | Takahashi et al. | 438/14 |
| 6,458,206 B1 | * | 10/2002 | Givargizov et al. | 117/101 |
| 6,825,645 B2 | * | 11/2004 | Kelly et al. | 324/72.5 |
| 6,845,655 B2 | * | 1/2005 | van der Weide et al. | 73/105 |
| 7,130,755 B2 | * | 10/2006 | Lee et al. | 702/97 |
| 7,190,175 B1 | * | 3/2007 | Kelly et al. | 324/637 |
| 7,282,911 B2 | * | 10/2007 | Xiang et al. | 324/304 |

(Continued)

OTHER PUBLICATIONS

Tselev, A., et al., "Near-field microwave microscope with improved sensitivity and spatial resolution" Rev Sci. Instrum. 74, 3167 (2003).*

(Continued)

*Primary Examiner* — David A Vanore
*Assistant Examiner* — Wyatt Stoffa
(74) *Attorney, Agent, or Firm* — Charles S. Guenzer

(57) ABSTRACT

A microwave microscope including a probe tip electrode vertically positionable over a sample and projecting downwardly from the end of a cantilever. A transmission line connecting the tip electrode to the electronic control system extends along the cantilever and is separated from a ground plane at the bottom of the cantilever by a dielectric layer. The probe tip may be vertically tapped near or at the sample surface at a low frequency and the microwave signal reflected from the tip/sample interaction is demodulated at the low frequency. Alternatively, a low-frequency electrical signal is also a non-linear electrical element associated with the probe tip to non-linearly interact with the applied microwave signal and the reflected non-linear microwave signal is detected at the low frequency. The non-linear element may be semiconductor junction formed near the apex of the probe tip or be an FET formed at the base of a semiconducting tip.

26 Claims, 9 Drawing Sheets

U.S. PATENT DOCUMENTS

| | | | |
|---|---|---|---|
| 7,285,963 B2 * | 10/2007 | Talanov et al. | 324/635 |
| 7,319,224 B2 * | 1/2008 | Park et al. | 250/306 |
| 7,550,963 B1 * | 6/2009 | Xiang et al. | 324/754.23 |
| 7,618,465 B2 * | 11/2009 | Klein et al. | 850/32 |
| 7,745,206 B2 * | 6/2010 | Wang et al. | 435/287.2 |
| 7,759,954 B2 * | 7/2010 | Ko et al. | 324/755.07 |
| 7,861,316 B2 * | 12/2010 | van der Weide et al. | 850/21 |
| 2002/0067170 A1 * | 6/2002 | Ookubo | 324/635 |
| 2003/0071605 A1 * | 4/2003 | Kelly et al. | 324/72.5 |
| 2003/0155934 A1 * | 8/2003 | Moreland et al. | 324/629 |
| 2003/0172726 A1 * | 9/2003 | Yasutake et al. | 73/105 |
| 2004/0182140 A1 * | 9/2004 | Weide et al. | 73/105 |
| 2005/0262930 A1 * | 12/2005 | Shao et al. | 73/105 |
| 2006/0125465 A1 * | 6/2006 | Xiang et al. | 324/72.5 |
| 2007/0216422 A1 * | 9/2007 | Sekiguchi | 324/637 |
| 2008/0135749 A1 * | 6/2008 | van der Weide et al. | 250/306 |
| 2008/0315092 A1 * | 12/2008 | Kley | 250/307 |
| 2009/0302866 A1 * | 12/2009 | Xiang et al. | 324/636 |
| 2010/0031404 A1 * | 2/2010 | Rychen | 850/33 |
| 2010/0071100 A1 * | 3/2010 | Faris | 850/57 |
| 2010/0170016 A1 * | 7/2010 | Schilling et al. | 850/21 |
| 2010/0218286 A1 * | 8/2010 | Lai et al. | 850/6 |

OTHER PUBLICATIONS

Lai, K., et al., "Calibration of shielded microwave probes using bulk dielectrics" Appl. Phys. Lett. 93, 123105 (2008).*

* cited by examiner

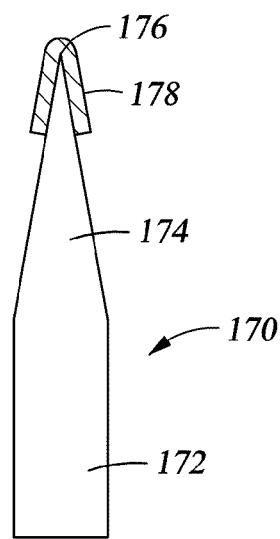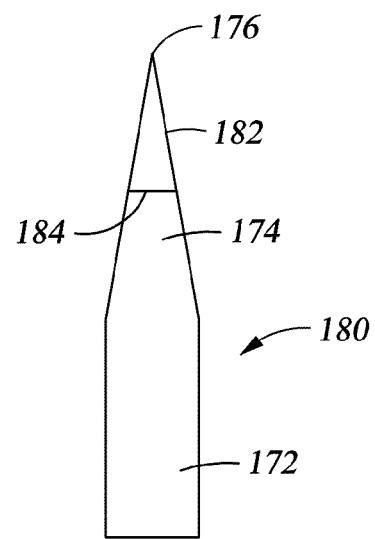
*Fig. 11*   *Fig. 12*
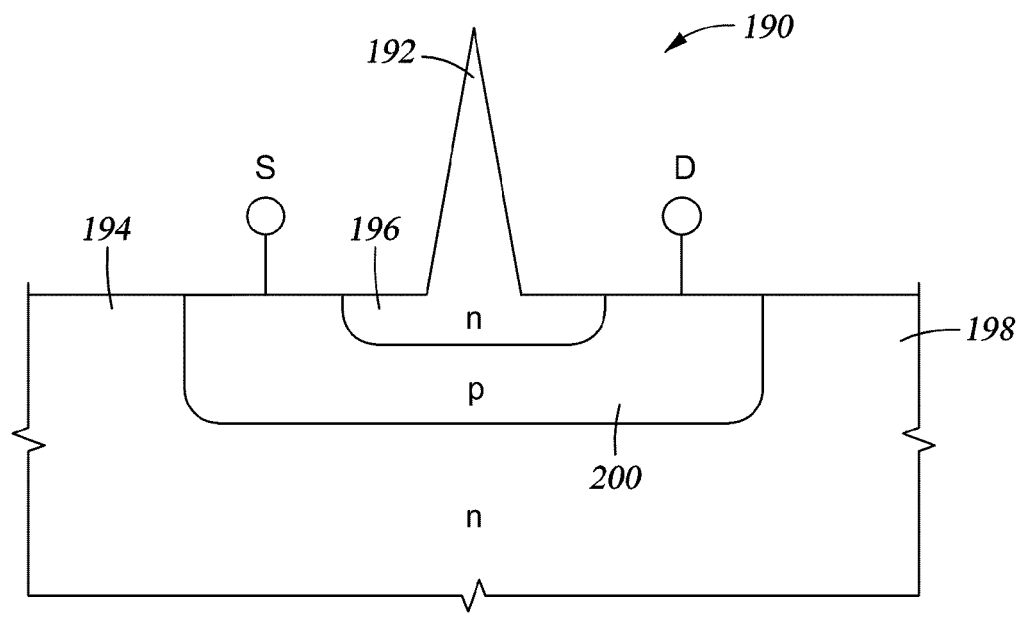
*Fig. 13*

MODULATED MICROWAVE MICROSCOPY AND PROBES USED THEREWITH

RELATED APPLICATION

This application claims benefit of provisional application 61/208,135, filed Feb. 20, 2009, incorporated herein by reference.

GOVERNMENT INTEREST

The invention is supported in part by the Center for Probing the Nanoscale (CPN) of Stanford University under National Science Foundation grant no. PHY-0425897 and is also supported by Department of Energy contracts DE-FG033-01ER45929-A001 and DE-FG36-08GOU7994.

FIELD OF THE INVENTION

The invention relates generally to microwave microscopy including modulating the interaction of the microwave radiation with the sample. In particular, the invention relates to microwave probes particularly useful for imaging with atomic force microscopy.

BACKGROUND ART

Two important technologies for imaging microscopic features, particularly on a generally planar substrate such as an integrated circuit, include atomic force microscopy (AFM) and microwave impedance microscopy. In AFM, a nanometer-scale probe tip is dragged or tapped along a surface and its deflection is measured to thereby determine the topography of the surface, that is, to image its physical contour. In microwave impedance microscopy, for example, as explained by Kelly et al. in U.S. Pat. No. 7,190,175, incorporated herein by reference, a microwave probe is scanned over the surface of a sample and the microwave (electrical) impedance of the sample is measured to thereby image the impedance of the sample, for example, the pattern of conductive interconnects on a dielectric layer for which the physical contour is not of primary importance. In some implementations, the microwave probe is imbedded in a dielectric pad to protect it from damage during scanning contact, but the geometry decreased the resolution of the microwave measure. On the other hand, exposed microwave probes dragged along a surface are subject to erosion and the wear decreases their lifetimes. Conventional microwave probes also suffer from low signal-to-noise.

SUMMARY OF THE INVENTION

One aspect of the invention includes a cantilevered microwave probe tip positionable over the sample with a pointed probe electrode at its distal end and connected via one or more transmission lines to the cantilever mount and system electronics in which a ground plane is established at the bottom of the cantilever overlying the sample. Another ground plane can be established over the top of the cantilever or the transmission line may be laterally surrounded by two grounded lines.

Another aspect of the invention includes a microwave microscope in which the microwave interaction between the probe electrode and the sample is modulated at or near the probe electrode.

In one embodiment, the microwave microscope operates in spatial modulation mode in which the probe electrode is oscillated over the sample and the interaction of the probing microwave signal with the sample is detected as a reflected microwave signal and a differential of the detected signal is determine at two vertical separations of the probe from the sample. This mode is similar to the tapping mode in atomic force microscopy (AFM) except that the tip/sample spacing need not be so small that the cantilever mechanically deflects, whereby sample damage is significantly reduced.

The spatial modulation may be driven at a modulation frequency near the resonant frequency of the cantilever to be approximately sinusoidal and the derivative of the reflected microwave signal with respect to the modulation frequency is electronically derived.

In a slow spatial modulation at a modulation frequency substantially below the resonant frequency, the probe tip is vertically controlled to two separation distances from the sample and the reflected microwave signal is differenced between the two separations.

The modulated microwave microscope may be combined with an atomic force microscope to provide supplemental positioning or to allow different types of imaging of a sample.

In another embodiment, a non-linear electrical element is associated with the probe tip no farther than 10% of the cantilever length from the probe tip. Probing signals at a microwave frequency and a different frequency, perhaps another microwave frequency or a much lower frequency, are applied to the interaction area to generate non-linear components including sidebands at the sum and difference of the two frequencies. Thereby, the non-linear component modulates the primary microwave signal according to the second signal. The sidebands are electronically detected by use of frequency-sensitive electronics such as mixers and lock-in amplifiers referenced to the two probing frequencies.

The non-linear element may be the interaction of a metal probe tip and a semiconductor sample, or vice versa or other structure forming a semiconductor barrier Alternatively, the probe tip may include a Schottky barrier or a semiconductor coating on a metal probe tip or a p-n junction formed by semiconductor layers of opposite conductivity types at the probe tip. A semiconductor probe tip of one conductivity type may have its base formed in a semiconductor well of the opposite conductivity type to produce a gate conduction channel and forming a field effect transistor with gain.

Another aspect of the invention includes probe having a conically shaped metallic probe tip conformally coated with a dielectric layer of a conically shaped shell and having a grounding sheath surrounding the dielectric shell.

BRIEF DESCRIPTION OF THE DRAWINGS

FIG. 11 is a cross-sectional view of a non-linear probe tip having a metal layer formed on a semiconductor tip body.

FIG. 12 is a cross-sectional view of a non-linear probe tip having a bipolar semiconductor junction formed adjacent to its tip.

FIG. 13 is a cross-sectional view of a non-linear probe having its probe tip forming the gate of a field effect transistor.

DETAILED DESCRIPTION OF THE PREFERRED EMBODIMENTS

Figure 1:
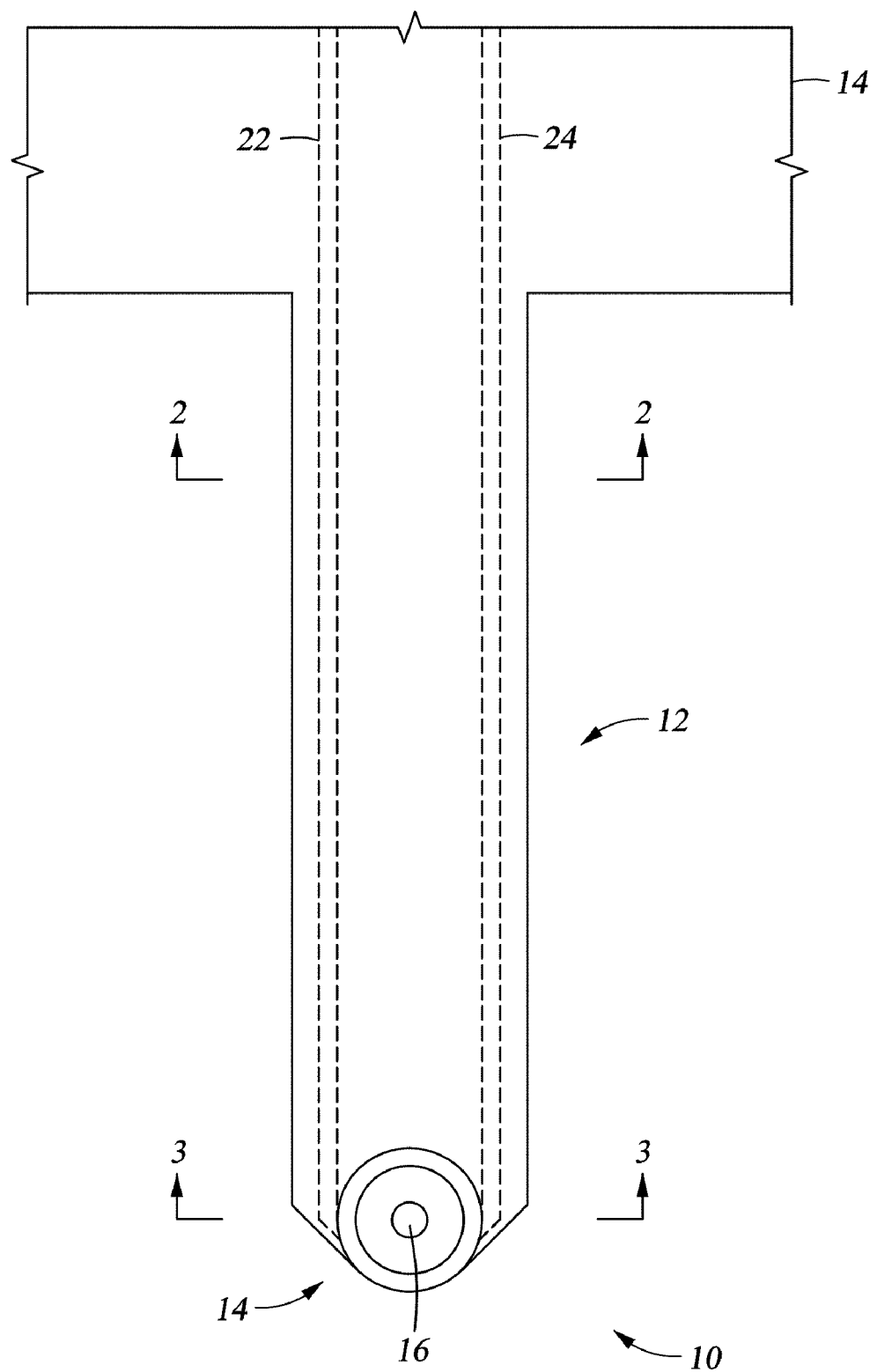
FIG. 1 is a bottom plan view of an embodiment of a probe of one aspect of the invention.

One aspect of the invention overcomes a difficulty experienced with the cantilever probe of the sort described by Kelly et al. in U.S. Pat. No. 7,190,175 arising from the structure that the two electrical leads extend along the length of the cantilever and are relatively long. In their co-planar strip line configuration, the two leads of the strip line are subject to significant noise and parasitic capacitance, particularly to the underlying sample. In an embodiment incorporating this aspect of the invention, a microwave probe 10 illustrated in plan view in FIG. 1, which is approximately to scale, includes a cantilever 12 about 100 micron wide and 500 micron long and attached on its proximal end to a mount 14 and including on its distal end a probe end 14 with a probe tip 16 projecting generally perpendicularly from the cantilever. The cantilever 12 and mount 14 may be formed from a silicon chip by techniques generally used in the integrated circuit industry, as explained in more detail in U.S. Pat. No. 7,190,175 and by Lai et al. in "Atomic-force-microscope-compatible near-field scanning microwave microscope with separate excitation and sensing probes," *Review of Scientific Instruments*, vol. 78, no. 63702, 5 pp. (2007), incorporated herein by reference. The mount 14 is fairly rigid and is attached to support equipment while the cantilever 12, from which the underlying chip is removed, is relatively thin, preferably less than 20 microns and more preferably less than 10 microns so that it readily flexes and easily bends, for example over 10 or 15°.

Figure 2:
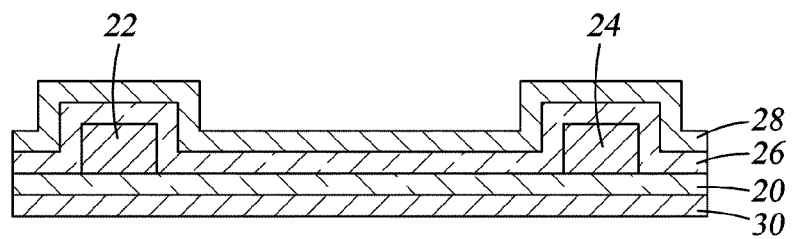
FIG. 2 is a cross-sectional view of one embodiment of the transmission lines taken along section line 2-2 of the cantilever portion of the probe of FIG. 1.

The cantilever 12, as illustrated in the cross-sectional view of FIG. 2 taken along the section line 2-2 of FIG. 1, includes a lower dielectric layer 20 on which are formed two conductive traces 22, 24 extending along the cantilever 12. An upper dielectric layer 26 is conformally coated over and between the traces 22, 24 such that the dielectric layers 20, 26 sandwich the traces 22, 24. A front conductive layer 28 is generally conformally coated on the upper dielectric layer 26 on the front side of the cantilever 12, which is typically oriented downwardly towards the sample. An optional back conductive layer 30 may coat the back side of the cantilever 12, which is typically oriented upwardly away from the sample. The conductive layers 28, 30 act as grounding planes to the traces 22, 24. The conductive layers 28, 30 and traces 22, 24 may be formed of aluminum by sputtering. The structure may be formed by first coating the optional unpatterned back conductive layer 30 on an unpatterned silicon chip, depositing the bottom dielectric layer 26 of $Si_3N_4$ to a thickness of about 2 microns by low-pressure chemical vapor deposition (LPCVD), depositing a metal layer with about 1 micron of aluminum and patterning it to 10 micron lines with 60 micron spacing to form the traces 22, 24, depositing the top dielectric layer 26 of $Si_3N_4$ to a thickness of 2 microns by plasma enhanced chemical vapor deposition (PECVD), and finally depositing 0.5 micron of aluminum to form the front conductive layer 28.

Figure 3:
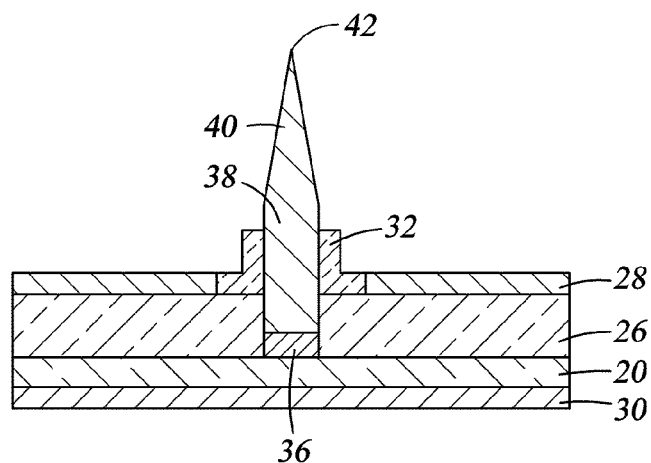
FIG. 3 is a cross-sectional view of an embodiment of the probe tip area taken along section line 3-3 of the probe of FIG. 1.

Near the probe end 14, as illustrated in the cross-sectional view of FIG. 3 taken along section line 3-3 of FIG. 1, a 2 micron dielectric pedestal 32 of $SiO_2$ is deposited by PECVD. A 2 micron via is etched through the pedestal 32 and the upper dielectric layer 26 to reach a trace contact 36 connected to one trace 22. Platinum may be deposited by focused ion beam (FIB) to form a pointed electrode 38 with a length of about 3 microns and having a base with a diameter of about 1 micron and a conical section 40 with a full-width angle of about 15° tapering inwardly to an apex 42 with a radius of less than 100 nm, which determines the lateral resolution of the microscope. The FIB fabrication relies upon a focused beam of energetic ions incident upon the sample surface, which is simultaneously exposed to a usually organic precursor, to provide the reaction energy necessary to drive the chemical vapor deposition process. Alternatively, the conical section 40 of the pointed electrode 38 can be formed as a pyramidal section that is anisotropically etched from monocrystalline silicon or other semiconductor to produce a more durable tip.

After fabrication of the layered structure, the cantilever 12 and mount 14 are masked off and the exposed portions etched away. The silicon underlying the cantilever 12 is then selectively etched away from its backside, for example, with KOH, to form the cantilever 12 projecting from the mount 14. Further details of the fabrication of the probe are found in U.S. Pat. No. 7,190,175.

The two grounded conductive layers 28, 30 and signal-carrying traces 22, 24 may form two transmission lines since the separation between the traces 22, 24 is much greater than their separation from the conductive layers 28, 30. Also, the double grounding reduces the amount of noise coupled into the long metal signal traces or strips extending along the cantilever 12, especially the strip carrying the small microwave signal reflected from the sample. The noise in large part arises from stray capacitance to the sample underlying the cantilever and the resistance of the metal traces. Although separate metal strips and electrodes may be used for the excitation and reflected signals, a single metal strip connected to the single probe tip in conjunction with a directional coupler at the receiver is advantageously shielded by the dual grounding planes. An optional grounded guard ring around the probe tip may provide added isolation or such as a ring may serve as one of separate probe and sensing electrodes as described by Lai et al. in the aforecited article and in "Modeling and characterization of a cantilever-based near-field scanning microwave impedance microscope," *Review of Scientific Instrumentation*, vol. 79, no. 063703, 6 pp. (25 Jun. 2008), incorporated herein by reference.

Figure 4:
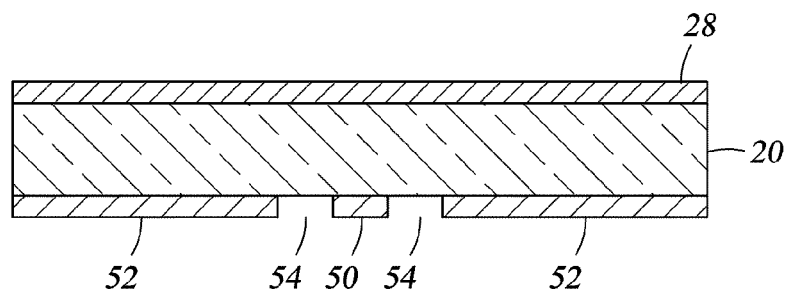
FIG. 4 is a cross-section view of another embodiment of the transmission lines taken along section line 2-2 of FIG. 1

In an alternative structure illustrated in the cross-sectional view of FIG. 4 taken along section line 2-2 of FIG. 1, the backside metal is patterned into a signal trace 50 and two parallel ground planes 52 separated from the signal trace 50 by gaps 54. Because the gaps 54 are much smaller than the thickness of the dielectric layer 20, the two ground planes 52 in conjunction with the intermediate metal trace 50 provide a flattened version of a coaxial cable. A backside dielectric layer may encapsulate the patterned metal 50, 52.

Both structures interpose a ground plane 28 between the one or more signal traces and the sample. The bottom ground plane extends axially with the traces over at least 90% of their length along the cantilever 12 exposed over the sample and extends laterally, if not over the entire width of the cantilever 12, then over a width at least ten times the sum of the width of the trace and the thickness of the intervening dielectric, thereby effectively grounding the trace and restricting the interaction of the probe with the sample. As a result, the probe is much less susceptible to noise and capacitive coupling to the sample and is sampling only a small area of the sample adjacent the probe tip rather than interacting with over a much large area of the sample underlying the major portion of the cantilever. Therefore, the probe of the invention is capable of more accurately measuring more localized effects.

Other probe tip configurations may be used. For example, as described in U.S. Pat. No. 7,190,175, the sharp tip electrode determining the microscope's resolution may be surrounded by a nearly co-planar annular electrode and separate transmission lines connect the two electrodes to the electronic control circuitry. The probe microwave signal may be applied to either of the electrodes and the microwave signal picked up by the other electrode is returned as the reflected signal to the control circuitry.

Figure 5:
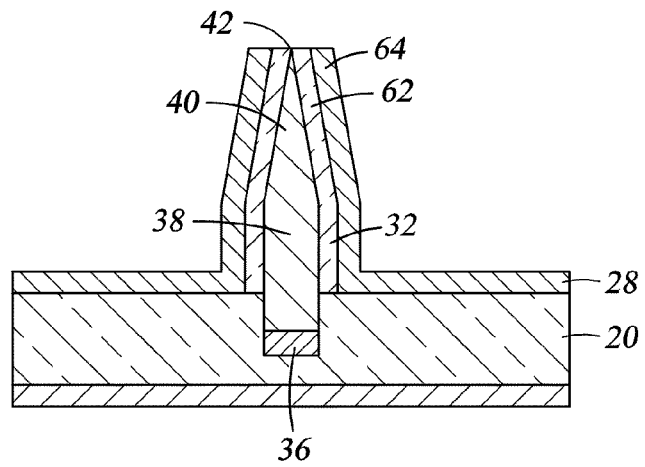
FIG. 5 is a cross-sectional view of another embodiment of the probe tip area taken along section line 3-3 of the probe of FIG. 1.

An improved probe tip, illustrated in the cross-sectional view of FIG. 5, includes a dielectric sheathing 62 at least 100 nm thick over much of the conical portion 40 of the pointed electrode 38 and a thinner conductive layer 64 at least 50 nm thick over the sheathing 62 which is connected to the front side metal 28. Assuming that the front side 28 is grounded, the conductive layer 64 also acts as a grounding shield for most of the pointed electrode 38. Further, the dielectric sheathing 62 acts to strengthen the very fragile apex 42. It is possible for the dielectric sheathing 62 to even cover the apex 42 with a very thin portion without significantly degrading the resolution of the probe tip.

The dielectric layers are preferably made of a strong, low-stress material, such as LPCVD silicon nitride or boron nitride, preferably at least 1 micron thick to minimize the capacitance between the conductive layers. The upper dielectric layer 26 may be a less strong material, such as PECVD silicon nitride, allowing a lower fabrication temperature. The tip is preferably made of monocrystalline silicon, which may be anisotropically etched to form a sharp tip with a diameter of 50 nm or less. Such an etched tip may have a trigonal or rectangular shape with three or four pyramidal sides depending upon the crystalline orientation. Alternatively, the tip may be made of a hard metal, such as titanium-tungsten or chromium, and formed by anisotropically etching a hole in a silicon layer and filling it with metal. In the latter configuration, the fabrication process first forms the tip in a silicon layer, then sequentially deposits the first metal, the dielectric, and the second metal, and finally moves the initial silicon layer.

Although the description and claims refers to microwave signals reflected from the sample, this is an operational description indicating the direction of information flow from the sample back to the system electronics. The sample is in the very near field of the microwave probe tip. Changes in the reflected signal are caused by changes in the impedance mismatch at the end of the microwave transmission line introduced by resistive and dielectric characteristics of the sample adjacent to the probe tip and do not necessarily imply a reflection at the surface of the sample.

Previously known microwave microscopes effectively measured one or more characteristics, such as resistivity and dielectric constant, by resolving the real and imaginary (in-phase and out-of-phase) components of the microwave signal reflected from the sample. That is, they measured the magnitude of the two microwave vector components. However, such measurements are plagued by noise, stray capacitance between the probe and the sample, temperature changes, equipment drift, and common mode signals with the microwave probing signal.

According to another aspect of the invention, the microwave microscopy system modulates the interaction of the microwave probing signal with the sample and accordingly demodulates the reflected signal to detect the modulated interaction, that is, the AC component of the reflected signal or sample characteristic rather than the DC component. The modulation may be a spatial modulation or an electrical modulation. The spatial modulation may be an analog modulation of the separation between the probe tip and the sample so as to continuously varying the interaction between the probe and sample, or a digital variation, such as sampling the reflected signal at two different interaction regimes. The differentiation resulting from analog spatial modulation or differencing resulting from digital spatial modulation removes a large portion of the effect of stray capacitance, low-frequency noise, and common-mode signal. However, the differential signals are low so that high-efficiency probes, such as those described above, are advantageously used. The modulation should produce more than just a linear response to a variation of the signal level applied to the sample but should result in either change in the type of interaction or a non-linear response of the probe signal.

One method of modulating the microwave interaction with the sample is to operate the microwave probe in space-modulation mode. That is, during sampling during the scan, the tip of the probe is oscillated in the vertical direction to typically repetitively tap the sample surface in a continuous or analog pattern. The microwave signal detected from the sample is demodulated and preferably phase-detected according to the frequency of the spatial modulation frequency. In a time-demodulation embodiment to be described later, the position of the probe tip is varied between a sensing position very close to the sample and a reference position widely separated from the sample. As will be shown later, the capacitance between the probe tip and sample varies with the separation between them so that the spatial modulation varies the impedance experienced by the microwave probe signal in interacting with the sample.

Space-modulation mode in microwave microscopy is similar to tapping mode widely practice in atomic force microscopy (AFM), in which the tapped mechanical tip or stylus oscillates very close to the sample surface, perhaps even touching it, as the tip is scanned over the sample in order to measure the typography of the surface. In AFM tapping mode, the AFM tip needs to be close enough to the surface that the tip is deflected by the sample/tip interaction, typically, less than 5 nm. However, in spatially modulated microwave microscopy, the vertically oscillating probe tip preferably does not physically contact the sample because the surface is being characterized according to the slope of the spatial capacitance curve as the tip vertically oscillates above the sample surface rather than a physical deflection as the tip encounters the sample.

Figure 6:
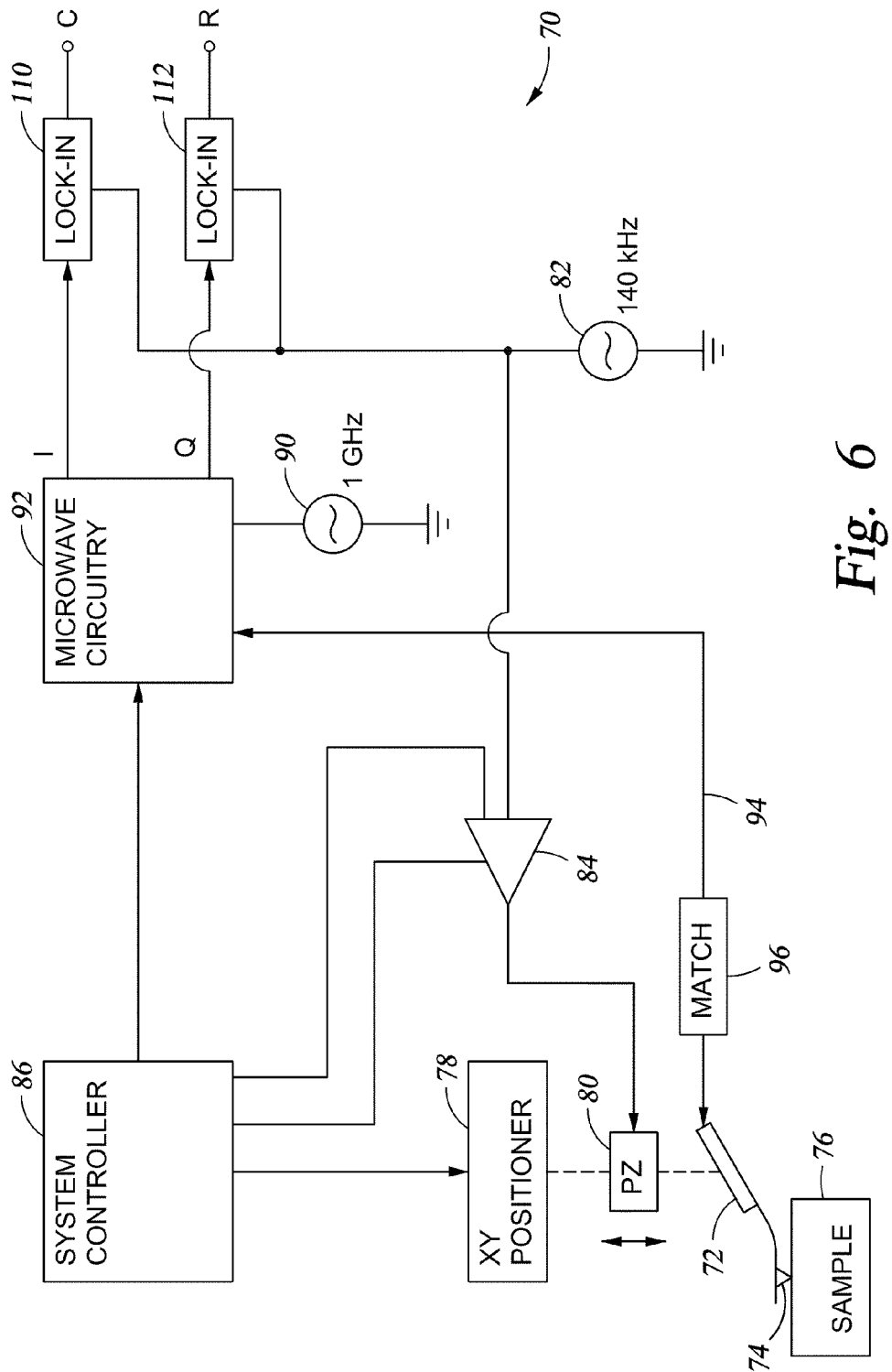
FIG. 6 is an electrical schematic of one embodiment of a spatially modulated microwave microscope system using lock-in amplifiers.

A spatially modulated microwave microscope system 70 illustrated in the block diagram of FIG. 6 includes a microwave probe 72, for example, the previously described probe 10, having a probe electrode 74 interacting with a sample 76. An XY positioner 78 supporting the probe 72 determines the x and y positions and possibly the coarse z position of the probe electrode 74 relative to the sample 76. However, a piezo-electric transducer 80 is interposed between the XY positioner 78 and the probe 72 to provide fine control of the z position of the probe tip 74. In this embodiment of tapping mode operation, a low frequency source 82 provides an oscillatory signal, which may be sinusoidal or square wave, at a low frequency $f_{LF}$ to a driver 84 that applies a drive signal to the piezo-electric transducer 80 and hence the vertical position of the probe electrode 74. It is typical for the low frequency $f_{LF}$ to be at or near the mechanical resonant frequency of the cantilever of the probe tip, for example, about 140 kHz to thereby minimize the drive power delivered to the piezoelectric transducer 80. However, the probe can be engineered for different resonant frequencies, for example, between 30 and 300 kHz. It is possible for the x-y positioning and the coarse z positioning to be performed by a stage upon which the sample 76 is supported so that the piezo-electric transducer 80 may be rigidly supported within the system as it controls the fine z positioning of the probe 72. A system controller 86 controls the XY positioner 78 and possible coarse z positioning and further controls through the driver 84 the amplitude of the piezo-electric drive signal and hence the amplitude of the probe oscillations. It is also possible for the system controller 86 to provide an analog DC or very low frequency signal to the input of the driver 84, which sums the two input signals to thereby provide both an oscillatory and fine z positioning of the probe 72.

A microwave source 90 outputs a signal at a microwave frequency $f_{MW}$, for example 1 GHz to a microwave circuitry 92, which outputs a microwave probe signal to the probe 72 and receives a reflected microwave signal. A microwave signal may be considered any electrical signal at a frequency of greater than 100 MHz, typically between 500 MHz and 10 GHz. By the use of directional couplers and mixers in the microwave circuitry 92, a single microwave transmission line 94 may be used between the microwave circuitry 92 and the probe 72 and only one of the probe traces is used for the microwave signals although grounds and other shielding lines are advantageously included, as has been described for the above described probes. In the usual configuration, the transmission line 94 is a 50 ohm coaxial cable having a center conductor carrying the microwave signal and a cylindrical outer conductor that is grounded and connected to the principal signal ground of the probe.

For optimum sensitivity, an impedance matching network 96 is needed in close proximity to the probe 72 to match the high tip/sample impedance to the standard 50 ohm impedance of the one or more coaxial transmission lines 94. A example of a matching network 96 illustrated in the electrical schematic of FIG. 7 includes a quarter-wavelength coaxial cable 98 having a length of one-quarter of a wavelength of the microwave radiation, for example, about 5 cm. Its outer sheath is grounded and its inner conductor is connected on the probe end through a lead 100 to a contact 102 of a sensor chip 104 supporting the cantilevered probe tip 74. Parasitic capacitance 106 of about 1 pF is associated with the lead 100. The end of the inner conductor of the quarter-wavelength coaxial cable 98 away from the probe is microwave grounded through a capacitor 108 of about 12 pF and connected to the inner conductor of the coaxial transmission line 94, thereby maximizing the microwave signals at the tip 74. The sheaths of the two coaxial transmission lines 94, 98 are connected together.

Returning to FIG. 6, the microwave circuitry 92 may include a microwave mixer mixing the reflected microwave signal from the probe 72 with the unmodulated microwave signal from the microwave source 90 to produce a signal representing the microwave amplitudes of the in-phase and quadrature microwave signals having amplitudes I and Q and their variations at frequencies much lower than the microwave frequency $f_{MW}$. The I and Q amplitude signals are delivered to two frequency-sensitive detectors 110, 112 such as lock-in amplifiers referenced to the low-frequency space-modulation frequency signal at $f_{LF}$ from the low-frequency source 82 to produce the respective differentials of the in-phase signal I and the quadrature signal Q relative to the tapping frequency $f_{LF}$. Although it is possible to obtain both in-phase and out-of-phase signals relative to the space-modulation frequency, in a simpler approach, the phases of the lock-in amplifiers 110, 112 are set to the maximum amplitude, which corresponds typically to the closest approach, and variations in the phase signal are ignored. The lock-in amplifiers may be replaced with detector systems sensitive to a very narrow bandwidth around the space-modulation frequency.

Figure 8:
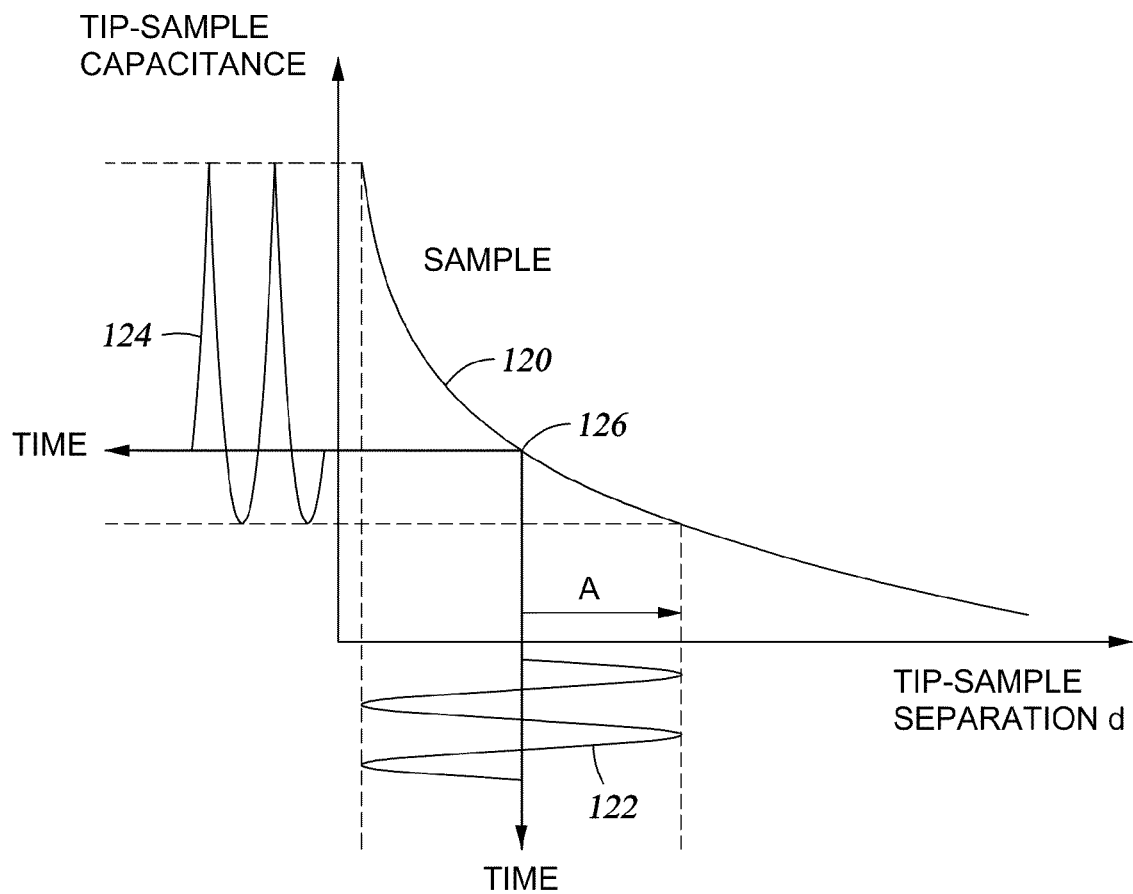
FIG. 8 is a graph illustrating the operation of the spatial modulated microwave microscope of FIG. 6.

The theory of operation of the spatially modulated microwave microscope will be described with reference to the diagram of FIG. 8 in which a static capacitance curve 120 represents the capacitance $C_{MIM}$ at microwave frequencies between the probe tip and the sample in arbitrary units along the vertical axis as a function of the separation d between the tip and sample in arbitrary units along the horizontal axis. The general scale is that capacitance $C_{MIM}$ is measured in attoFarads and the separation d in tens of nanometers. An oscillating position curve 122 shows the low-frequency time oscillation of the tip-sample separation d caused by the vertical tapping of the probe induced by the piezo-electric transducer 80. An oscillating microwave capacitance curve 124 shows the low-frequency time variation of the microwave tip-sample capacitance $C_{MIM}$ detected by the microwave circuitry 92. The oscillating position curve 122 is generally sinusoidal with an amplitude A about an operating point 126 of the static capacitance curve 120. The oscillating microwave capacitance curve 124 is a distorted sinusoidal about a value determined by the operating point 106. The in-phase lock-in amplifier 110 measures the amplitude of the oscillating microwave capacitance curve 104 referenced to the spatial modulation frequency, which can be considered to be the derivative $dC_{MIM}/dd$ of the static capacitance curve 120 at the operating point 126. If the static capacitance curve were nearly linear, the lock-in amplifier 110 would measure the slope of the static capacitance curve 124 at the operating point 126. The second derivative can be measured by demodulating at twice the spatial modulation frequency $2f_{LF}$, or more precisely, the lock-in amplifier 110 would measure the difference between the area of the oscillating capacitance curve 124 above the operating point 126 and the area below the operating point 126.

Similar curves can be constructed for the imaginary portion of the capacitance, that is, the conductivity, as detected as the out-of-phase component Q and measured by the out-of-phase lock-in amplifier 112. It is understood that depending upon the phase introduced in the microwave mixing, the in-phase and out-of-phase components can be switched between capacitance and conductivity. The amplitude of the oscillating separation curve 122 depends on the gain of the piezo-electric driver 84 and the operating point 126 is determined by the fine vertical input to the piezo-electric driver 84, both controlled by the system controller 86.

The spatially modulated microwave microscope system of FIG. 6 is an analog system based in part upon the resonant oscillations of the probe cantilever. A more digital detection system is possible. For example, the low-frequency source 82 can be replaced by a square-wave pulser outputting a drive signal at a drive frequency $f_2$, which controls the oscillation of the piezo-electric transducer 80, and the lock-in amplifiers 110, 112 can be replaced by time-domain demodulators locked to the pulser to detect the value of the microwave amplitudes output by the mixer at predetermined phases of the oscillation. Assuming that the drive frequency $f_2$ is near the resonance of the cantilever, the oscillating position curve 122 of FIG. 8 remains close to sinusoidal. One type of time-domain demodulators integrates with respect to the same zero value the positive portions and the negative portions of the oscillating capacitance curve 124 of FIG. 8 oscillating about the operating point 126 and differences the positive and negative portions. Operation is simplified if only selected portions the capacitance curve 124 are integrated in each half cycle, for example, over a phase window for example of 30° to 120° nearest the positive and negative peaks relative to the 180° of a half cycle, but the sampling phase window needs to be the same for the positive and negative portion. If the drive frequency $f_2$ is 140 kHz, the full cycle is about 8 microseconds, well within the capabilities of simple electronics.

Figure 9:
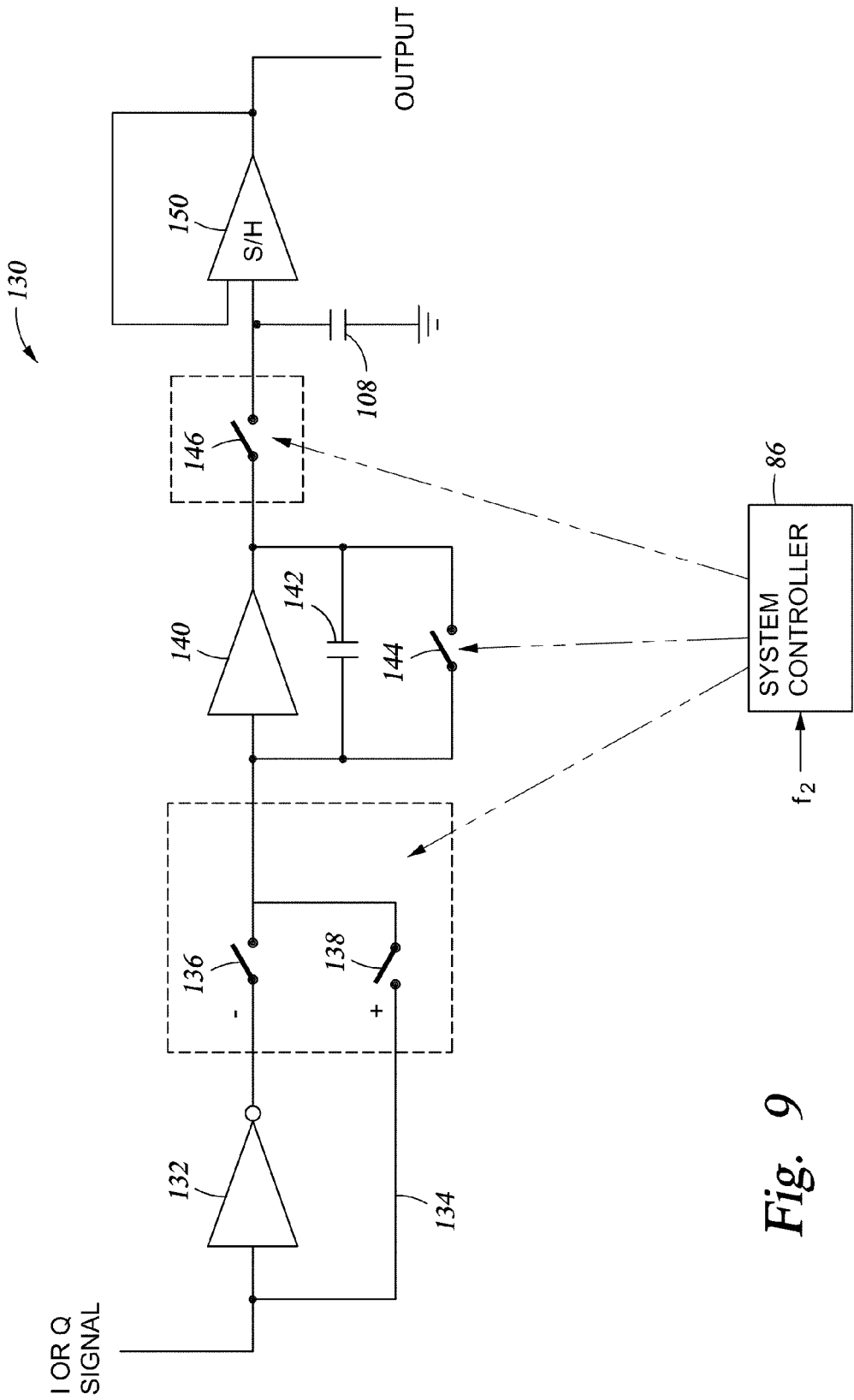
FIG. 9 is an electrical schematic of a second embodiment of a spatially modulated microwave microscope system using time-domain demodulators.

An example of a digital time domain demodulator 130 for either the I or Q quadrature signal is illustrated in the electrical schematic of FIG. 9. The system controller 86 receives the modulation drive signal at $f_2$ and accordingly controls the circuitry over the cycle. An inverter 132 receives either the I or Q signal, which remain non-inverted on a bypass line 134. The controller 86 controls analog gates 136, 138 receiving respectively the inverted and non-inverted quadrature signals. The inverted gate 136 is opened during the sampling phase window for the negative portion of the quadrature signal and the non-inverted gate 138 is opened during the sampling phase window for the positive portion. During other time periods, the gates 136, 138 are closed to isolate the remainder of the circuitry from the quadrature signal.

The outputs of the gates 136, 138 are combined on the input to an integrating amplifier 140 including an integrating capacitor 142 and parallel zeroing gate 144 in a feedback path around the integrating amplifier 140. The controller 86 closes the zeroing gate 142 for a short period at the beginning of a full cycle to enable operation of the integrating amplifier 140. During one half cycle, the integrating amplifier 140 integrates onto the capacitor 142 the non-inverted quadrature signal passing the opened analog gate 138; during the other half cycle, it integrates onto the capacitor 142 the inverted quadrature signal passing the opened analog gate 136. Because of the time multiplexed inversion of the quadrature signal, the integrating amplifier 140 also differences the signals received in the two half cycles. At the end of a full cycle and between the two sampling phase windows, the controller 86 opens a transfer gate 146 to transfer the signal on the integrating capacitor 142 to a storage capacitor 148 coupled to the output by a sample/hold circuit 150. After the charge transfer, the controller 86 closes the transfer gate 144 and opens the zeroing gate 144 to zero the charge on the integrating capacitor 142 and then closes it to begin the next measurement cycle. The output of the sample and hold circuit 150, which is refreshed every cycle, outputs every sample period the difference signal for the I or Q quadrature signal. If desired, these outputs can be averaged over several cycles if the probe tip is probing the same area of the sample over several tapping cycles. Other circuitry may be used to align phases of the mechanical spatial modulation and the time domain demodulation.

Spatially modulated microwave microscopy may be implemented on commercially available AFM equipment enabled for tapping-mode AFM, such as from PacificNanotech, by substituting a microwave probe tip with associated electronics for the conventional AFM sylus tip. In spatially modulated microwave microscopy, the vertically oscillating microwave tip preferably lightly touches the surface as it laterally scans over the surface but alternatively may vertically oscillate slightly above the surface. The operating point for the vertical motion may be determined by use of the laser sensor associated with the AFM probe to detect its vertical deflection as it mechanically interacts with the sample via electrostatic, van der Waals, and mechanical forces or by an initial calibration relating the derivative observed from the lock-in amplifier to the tip-sample separation. Successful operation of the spatial-modulation mode microwave microscope and some details of its fabrication have been reported by Lai et al. in "Tapping mode microwave impedance microscopy," *Review of Scientific Instruments*, vol. 80, no. 43707, 3 pp. (27 Apr. 2009), incorporated herein by reference. The spatial modulation microwave microscope showed much less instrumental drift than contact microwave microscope and readily detected 1 micron silica lines buried under 50 nm of alumina.

Further experiments have demonstrated the operation of the microwave microscope for imaging features under water using a shield probe but no spatial modulation. Further improved resolution is expected with spatial modulation. As a result, the microwave microscope may be applied to in vitro and in vivo biological and histological samples. Its high sensitivity should allow the study of dynamic biological behavior such as depolarization association with axon members and metabolic processes. Further, because the probe tip is not dragged across the sample, the inventive microwave microscope can be applied to soft tissue.

In the resonant sinusoidal space-modulation mode, the microwave signals sharply increases as the probe's closest trajectory approaches the sample and then at closer trajectory or touching the signal no longer increases but saturates. Monitoring of the second harmonic $2f_{MW}$, is particularly effective whether measuring impedance or measuring topography, as will be described later.

On the other hand, at sufficiently low spatial modulation frequencies less than the resonant frequency called slow space-modulation mode, the vertical position of the probe tip can be established by the system controller and microwave measurements are taken at that position. An exemplary frequency for the slow space-modulation mode under automated control is 400 Hz, but other frequencies, for example, 10 kHz and lower, may be used with conventionally engineered probe tips. In this type of slow space-modulation mode, the probe tip is positioned at two different heights, one close to or contacting the sample and the other significantly above, and the two measurements are differenced so as to significantly reduce noise and common mode effects. The digital measurement circuitry of FIG. 9 can be adapted to the slow space-modulation mode in which digital control signals replace the square-wave pulsed reference signal at 140 kHz. In slow space-modulation mode, the AFM laser sensor can monitor the probe cantilever as it approaches the sample. During the approach, there is initially an attractive force, then a repulsive one. The laser sensor monitors the deflecting force and accordingly controls the tip position to be close to the sample.

Figure 7:
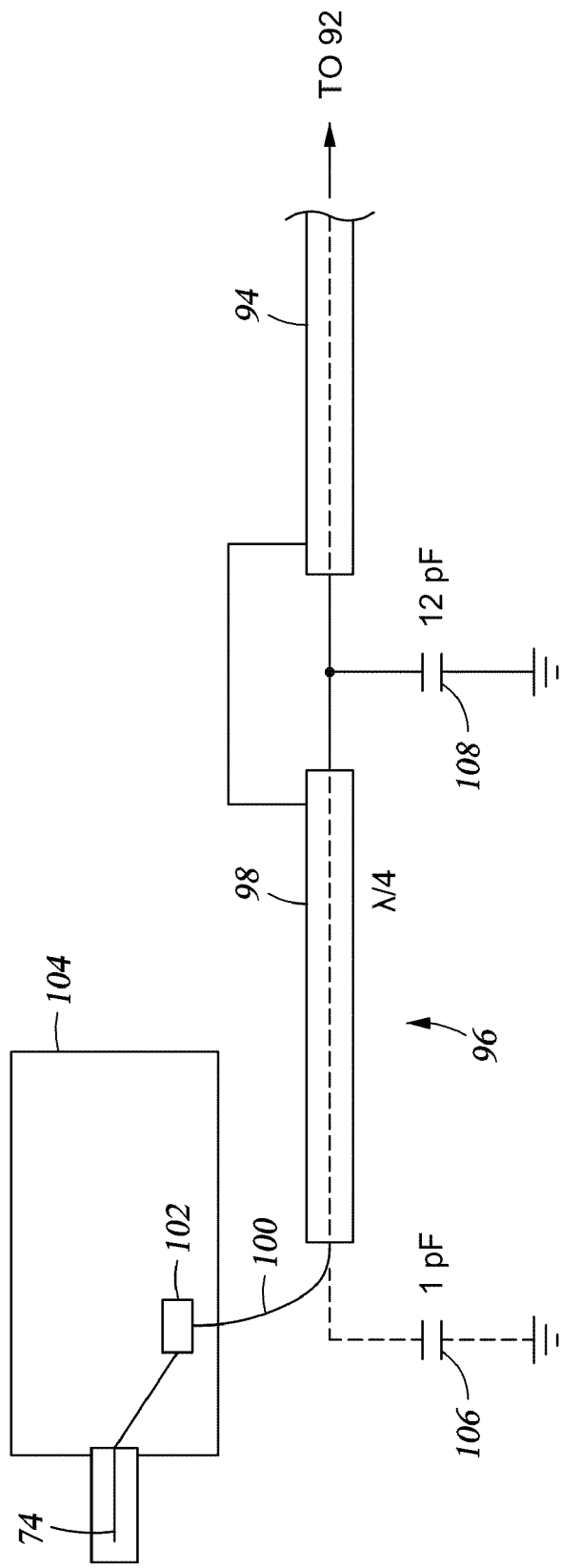
FIG. 7 is an electrical schematic of a matching circuit adjacent the and connecting to the coaxial cable to the system controller.

As explained with reference to FIG. 7, either the time demodulation or the slow spatial modulation effectively measures the static capacitance $C_{MIM}$ at two points on the static capacitance curve 100 and then differences the two values. In view of the sharp increase in the static capacitance as the probe approaches the sample and assuming one measurement is taken close to the sample and the other relatively far away, the differential value effectively represents the capacitance $C_{MIM}$ near the sample with the noise, drift, and common mode signal averaged out in the differencing.

Since the operating point (mean vertical position) can be controlled separately from the sensing, it is possible to operate the microwave microscope in two distinctive regimes. In a rough scanning mode, the probe tip is oscillated at a significant distance from a sample and a fast lateral scan provides a rapid scan of large areas with reduced spatial resolution. In a fine scanning mode, perhaps performed after the rough scanning mode has identified features of interest, the probe is lowered closer to the sample and a slower, more methodical scan provides a more highly resolved but slow scan of the tiny features.

It is understood that the microwave microscope is most useful in a scanning or imaging mode in which the probe is scanned over the sample to image the electrical characteristics of the sample at microwave frequencies, in a simple example, imaging a metal line in a dielectric substrate. However, the differencing requires that the two or more measured values be performed at substantially the same location of the sample. More particularly, the spatial modulation frequency or rate or sampling rate is much greater, for example by a factor of ten, than the lateral speed divided by the spatial resolution to be achieved by the microscope.

The above described space modulation modulates the microwave coupling based on the instantaneous spacing between the probe tip and sample and the signal modulation is generally non-linear with the spacing. Absent the variable spacing, the conventional microwave microscope with a typical electrically linear probe has difficulty separating the desired reflected signal from the sample/probe interaction and the much larger excitation signal or spurious interactions between the microwave transmission lines and their environment.

The above described spatially modulated microwave microscopes rely upon the modulation of the interaction between the microwave signal and the sample by mechanically moving the probe tip vertically above the sample. Similar modulation can be achieved electrically by relying upon a non-linear microwave circuit element and passing both the microwave sampling signal at $f_1$, for example 1 GHz and another signal at a different frequency $f_2$ through the non-linear element, which produces sidebands at $(f_1 \pm f_2)$ and then measuring the sidebands at the detector. Both signals may be microwave signals and the lower-frequency sideband is then detected. While a microwave signal at $f_2$ may increase the sensitivity, the circuitry is simplified if $f_2$ is much lower than the microwave frequency $f_2$, for example, less than 10% of the microwave frequency $f_1$ but preferably an RF frequency more than 1 MHz to increase the non-linear signal. Advantageously, the non-linear circuit element is positioned near the probe tip, for example, no farther from it than 10% of the cantilever. Thereby, the parasitic capacitance along the cantilever has relatively little effect on already established sidebands rather than on the larger microwave signals traversing the cantilever. Whatever signals are capacitively coupled into the reflected signal on the transmission line in the cantilever do not pass through the non-linear element and hence are canceled out in the frequency-locked detection circuitry. Mechanical vertical oscillation tapping is not required and the more conventional microwave microscope systems of U.S. Pat. No. 7,190,175 may be used with suitable inclusion of a non-linear element and additional electrical circuitry.

Figure 10:
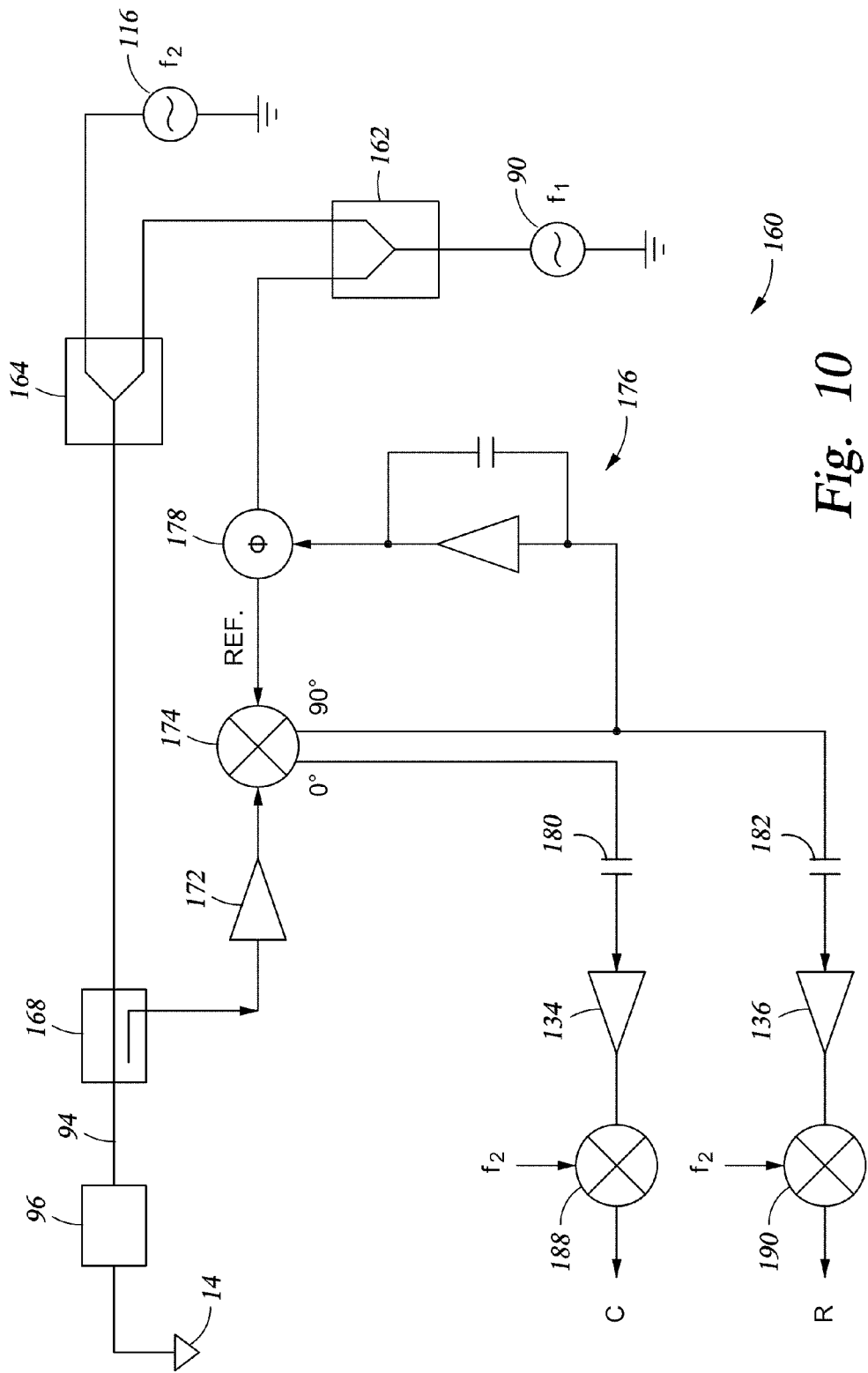
FIG. 10 is an electrical schematic of one embodiment of a non-linearly modulated microwave microscope system.
Figure 14:
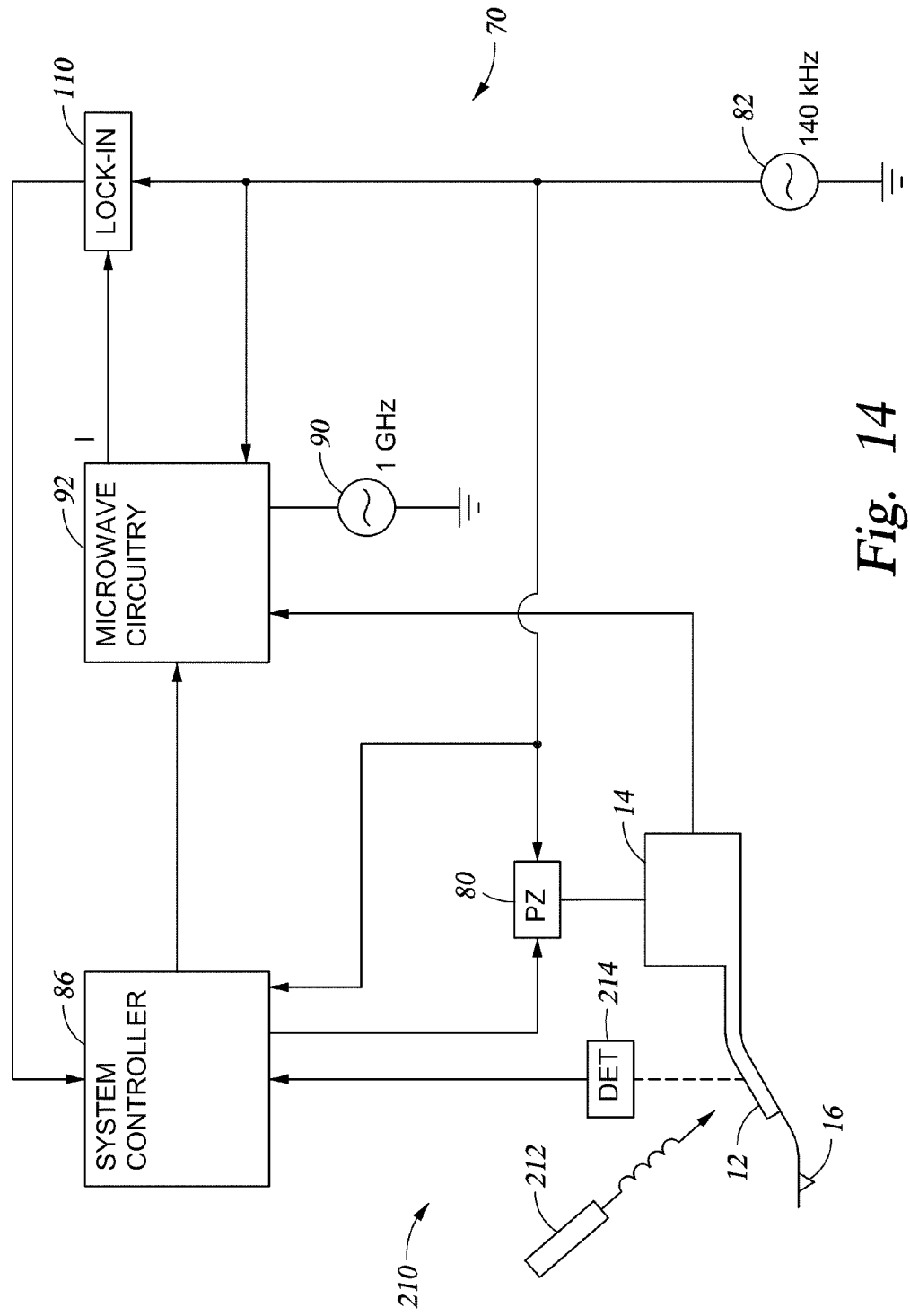
FIG. 14 is a electrical schematic of a system combining atomic force microscopy and modulated microwave microscopy.

An example of a non-linearly modulated microwave microscope system 160 illustrated in the electrical circuit of FIG. 10 modulates the non-linear circuit element associated with the probe tip and measures a signal produced by the non-linear interaction to determine electrical characteristics of the sample. The output of the high-frequency microwave source 90 at frequency $f_1$ is split by a divider 162 and then combined in a combiner 164 with the output from an RF source 166 at frequency $f_2$. Exemplary frequencies are 1 GHz for $f_1$ and 10 MHz for $f_2$. However, as mentioned before, the second frequency $f_2$ may also be a microwave frequency but different from the first by a sideband frequency which is detected. The combined signals pass through a directional coupler 168 to the coaxial transmission line 94 and thence to the matching circuit 96 adjacent the probe, which supplies the combined signal to the probe tip 14 including its non-linear element. The reflected signal including its non-linearly generated sideband passes back through the matching circuit 96 and the transmission line 94, and the directional coupler 168 directs it through a 25 dB microwave amplifier 172 to an IQ mixer 174 also receiving the unmodulated microwave source signal at $f_1$ from the microwave source 90. The IQ mixer 174 produces through a heterodyne circuit two quadrature mixed signals that are 90° out of phase and which include DC components, RF components and higher harmonics of $f_1$. To compensate for drifting in the phase of the signals due to temperature or other changes in the cables and electronic components, a feedback loop 176 on one of the mixer outputs controls a phase shifter 178 for the reference signal at $f_1$ to the IQ mixer so that the DC and RF components appear in the in-phase signal at 0°. The two quadrature signals I and Q pass through respective high-pass filters 180, 182 and RF amplifiers 184, 186 and are demodulated in two RF mixers 188, 190 also receiving the unmodulated RF signal at $f_2$ from the RF source 116. Their outputs represent the real and imaginary parts of sample/electrode interaction.

The non-linear element usable with the non-linearly modulated microwave microscope system 160 of FIG. 10 may be a semiconductor barrier formed at the interface between a metal and doped semiconductor, such as silicon, which operates as a Schottky diode and may be highly non-linear.

In the case where a doped silicon feature is being probed, a Schottky diode is formed between a metal probe tip and the doped silicon feature. Although the circuitry of FIG. 10 may be used, in this case, the low-frequency RF signal may be applied directly to the silicon feature and the microwave signal is applied to a metallic microwave probe tip, such as the previously described platinum tip. The microwave signal reflected back from the probe, especially the Pt probe tip, will contain the non-linear sideband produced in conjunction with the RF signal impressed on the sample.

Alternatively, if a metallic structure in a sample is being probed, the low-frequency signal may be applied to the metallic structure and the microwave probe signal is applied to a probe tip composed of doped silicon. Even if a non-conductive dielectric feature is being probed, the capacitance across the sample is much larger than that between the probe tip and the sample so that the sample surface will follow the modulating voltage. Again, the signal reflected back from the probe will contain the non-linear sideband.

Yet further, the Schottky structure can be formed on the probe tip. As illustrated in the cross-sectional view of FIG. 11, a pointed non-linear electrode 170 includes a doped monocrystalline silicon body 172 with a pyramidal portion 174 and apex 176. A metal layer 178, for example of tungsten, is conformally deposited around the apex 176. Alternatively, a non-linear effect is also obtained if a paraelectric layer is substituted for the metal layer 154. The paraelectric layer may also be applied to a metal pointed electrode. The paraelectric, such as a ferroelectric material such as $LiNbO_3$, exhibits a non-linear dielectric constant and hence capacitance varying with applied voltage and hence non-linearly couples the metal probe body 172 to the sample. The paraelectric layer is preferably not doped.

A complementary Schottky structure of a pointed non-linear metal electrode and a doped monocrystalline silicon coating is difficult to achieve.

A pointed bipolar electrode 180 illustrated in the cross-sectional view of FIG. 12 includes the doped silicon body 172 of one conductivity type and tip region 182 of the opposite conductivity type separated by a p-n junction 184 underlying the apex 176 and preferably in the pyramidal region 174. The structure is readily formed utilizing the fact that the pyramidal region 174 is formed by anisotropic etching of monocrystalline silicon. To obtain the illustrated structure, the unetched monocrystalline silicon is formed of two epitaxial silicon layers of opposite conductivity types with the p-n junction between them formed at a depth corresponding to the p-n junction 184 in the pyramidal region 174 of the etched pointed electrode 180.

A pointed transistor probe 190 illustrated in the cross-sectional view of FIG. 13 provides gain as well as non-linearity. A pointed silicon electrode 192 terminating in an apex is epitaxially formed over a silicon substrate 194 of a first conductivity type, n for example, or which is substantially insulating. The silicon electrode 192 is formed of the first conductivity type, n for example, and the same conductivity type extends to a gate region 196 underlying the pointed electrode 192. The pointed silicon electrode 192 terminates in an apex and may be formed by anisotropic etching of monocrystalline silicon. A well region 198 of an opposite, second conductivity type, p for example, is formed around and under the gate region 196 to create a thin channel region 200, which is thin enough that its lateral conductivity can be modulated by the voltage of the gate region 174. Gate and source contacts S and D are connected to portions of the well region 196 to form a field-effect transistor (FET) whose gate is interacting with the sample according to the measured the non-linear transconductance across the principal electrodes S and D. The transistor probe 190 needs at least two signals lines on the cantilever, one for a properly DC biased microwave probe signal applied to the pointed electrode 192 and another for the microwave signal monitored on the drain D, assuming a grounded or DC-biased source S.

The described embodiments for modulating the coupling of the microwave radiation can alternatively be described as modulating the coupling of the exciting signal according to a modulation signal (e.g. the 400 Hz or 140 kHz tapping signal or the 10 MHz heterodyne signal with a non-linear element) and demodulating the reflected signal according to the same modulation signal.

The microwave probe of the invention can advantageously be used for tapping mode atomic force microscopy (AFM) primarily directed to plotting the topography of a sample. In conventional AFM, the probe tip experiences little interaction with the sample over most of the oscillation cycle, for example, only when the tip is within about 5 nm of the sample. Conventionally, the probe position is monitored with a laser directed at the cantilever and typically measure the effective contact of the tip with the sample. Although tapping mode AFM can profile a soft sample, it still deleteriously contacts the sample. If the microwave probe tip of the invention is applied to AFM profiling, there may be a substantial microwave interaction of the tip with the sample over the entire tapping cycle as the long-range electrical fields are being monitored. As a result, the microwave signal can be used to monitor the probe height and vertically position the tip over the feature to be profiled. Once the static capacitance curve 126 of FIG. 8 has been established for a type of sample, the AC (differential) quadrature signal can determine the tip height even if the tip is relatively far from the sample so that the microwave signal can be used to position the tip above the sample without any laser feedback system. However, the laser deflection can be used to more accurately define the topography in some situations since the AFM may more precisely determine the surface profile by the laser-measured deflections of the cantilever. Alternatively, a fast microwave scan can determine not only the regions of interest but also the approximate height before a slower AFM focuses on the regions of interest for a more accurate measurement of local topography.

The combination of microwave microscopy and AFM also allows more rugged probes than those typically used in AFM since they are made extremely compliant in order to sense very small cantilever deflections, thus making them very fragile. Using the microwave signal for coarse positioning An example of such an enhanced AFM system 210 includes a laser source 212 irradiating the flexible cantilever 12 supporting the probe tip 16 from the mount 14. An optical detector 214 detects light reflected from the cantilever 12 and provides a signal to the system controller 86 indicative of the deflection of the cantilever 12 as it encounters the sample surface. The piezo-electric transducer 80 vertically oscillates the cantilever 12 near its resonance. The system controller 86 also provides a DC signal to the piezo-electric transducer 80 to control the mean height of the probe tip 16 over the sample. These functions are available on commercially available AFM systems. Additionally, according to this aspect of the invention, the microwave source 90 provides a signal to the microwave circuitry 92 to send a microwave probe signal to the probe tip 16. The microwave circuitry 92 extracts at least one sideband of the reflected microwave signal and outputs it to the lock-in amplifier 110 (or alternatively a time-domain demodulator). The demodulated signal is supplied to the system controller 86 as part of the control of the AFM circuitry. Of course, the system can be further enhanced to provide full microwave imaging as provided in FIGS. 6 and 9 as well as full AFM functionality.

The non-linear microwave tips can also be advantageously used with AFM to solve problems arising from stray capacitance that affect measuring either topography or impedance from the strength of the microwave signal. When the tip is more than a tip diameter away from the sample surface, approximately 50 nm, most of the microwave signal arises from the sample topography. The tip needs to be quite close to the sample for a least part of a tapping cycle to be able to distinguish the sample topography from the electrical properties of the sample.

The shielded probe and the signal differencing of the microwave microscope both significantly reduce noise and other instrumental effects, thus increasing the sensitivity and resolution of the microwave microscope. Particularly in combination, they enable microwave microscopy of new types of samples in the medical, biological, and real-time industrial inspection. Further, the probe need not significantly touch the sample so soft samples and production products may be inspected without damage.

What is claimed is:
1. A microwave microscope probe, comprising:
a probe tip having an apex positionable adjacent a surface of a sample and forming a first electrode; and
a cantilever arm extending along a cantilever axis, supported on a proximal end thereof, and supporting the probe tip projecting in a first direction toward the apex from a bottom surface of a distal end of the arm, wherein the arm comprises
   a first conductive layer disposed on a top surface of the distal end of the arm opposite the bottom surface and extending along the cantilever axis from the proximal end to the distal end of the arm,
   a first dielectric layer disposed in the first direction on the first conductive layer and extending from the proximal end to the distal end of the arm,
   a first conductive strip formed in the first direction on the first dielectric layer, extending along the cantilever axis from the proximal end to the distal end of the arm, and electrically connected to the apex of the probe tip for conveying microwave signals,
   a second dielectric layer disposed in the first direction on the first conductive strip, and
   a second conductive layer disposed in the first direction on the second dielectric layer and extending along the cantilever axis from the proximal end to the distal end of the arm.

2. The probe of claim 1, further comprising:
   a second electrode formed adjacent to and about the probe tip; and
   a second conductive strip disposed in a first direction on the dielectric layer, extending in parallel to the first conductive strip, and connected to the second electrode.

3. The probe of claim 1, wherein a width of the first conductive layer is greater than a sum of a width of the first conductive strip and a thickness of the dielectric layer.

4. A microwave microscope probe, comprising:
   a probe tip having a semiconductor barrier formed therein and having an apex positionable adjacant a surface of a sample; and
   a cantilever arm supported on proximal end of the arm and supporting the probe tip projecting in a first direction toward the apex from a bottom surface on a distal end of the arm, wherein the arm comprises
      a first conductive layer dispose in the first direction on top surface of the arm opposition the bottom surface and extending between the proximal and distal ends,
      a dielectric layer disposed in the first direction on the first conductive layer and extending between the proximal and distal ends, and
      a first conductive strip formed in the first direction on the dielectric layer, extending between the proximal and distal ends, and electrically connected to the apex of the probe tip for conveying a microwave signal which passes through the semiconductor barrier.

5. The probe of claim 4, wherein the barrier is a Schottky junction.

6. The probe of claim 4, wherein the barrier is a p-n junction across which at least one of the microwave signals passes.

7. A microwave microscope, comprising:
   a probe tip;
   a cantilever arm supported near its proximal end by an actuator positioned near the proximal end, and supporting the probe tip on its distal end;
   a source of microwave signal at a microwave frequency of greater than 100 MHz coupled to the probe tip and interacting with a sample adjacent the probe tip;
   means for modulating at a modulation frequency less than 10% of the microwave frequency a coupling of the microwave signal from the probe tip to a sample while the probe tip is vertically separated from the sample; and
   sensing circuitry receiving and electrically interacting microwave radiation reflected from the sample with an oscillatory electrical signal from the modulating means, for producing a differential of the received microwave radiation relative to at least two non-zero vertical separations of the probe tip from the sample.

8. The microscope of claim 7, wherein the modulating means induces the actuator to vary a spacing between the probe tip and the sample during a measurement at a lateral position on the sample that is minimally resolved by the sensing circuitry.

9. The microscope of claim 8, wherein the varying occurs at a spatial modulation frequency and the sensing circuitry includes a reference signal at the spatial modulation frequency used in processing the received microwave radiation.

10. The microscope of claim 7, wherein the modulating means includes a non-linear electrical element adjacent the probe tip and apart from the sample and the sensing circuitry detects a non-linear signal produced by the non-linear electrical element.

11. The microscope of claim 10, wherein the non-linear electrical element includes a semiconductor junction intermediate two semiconductor portions.

12. A microwave microscope for characterizing a sample, comprising:
   a probe tip;
   a cantilever arm supported near its proximal end by an actuator positioned near the proximal end, and supporting the probe tip on its distal end adjacent the sample;
   a source of microwave signal coupled to the probe tip and as an oscillatory first electrical signal and interacting with the sample adjacent the probe tip;
   a source of an oscillatory second electrical signal applied to the probe tip;
   means including a non-linear electrical element apart from the sample for modulating a coupling of the microwave signal from the probe tip to the sample according to the second electrical signal; and
   sensing circuitry, receiving microwave radiation reflected from the sample, detecting an amplitude of a signal at a sideband frequency having a first value determined between a second value of a frequency of the microwave signal and a third value of a frequency of the second electrical signal.

13. The microscope of claim 7, further comprising scanning means for moving the probe tip over a surface of the sample, wherein the modulation is performed while the probe tip is disposed within a single resolvable lateral position.

14. The microscope of claim 7, further comprising:
   a cantilever arm supported on a proximal end thereof, supporting the probe tip and including in the probe tip an apex projecting from the bottom surface on a distal end of the arm;
   a first conductive layer disposed on the bottom surface;
   a dielectric layer disposed over the first conductive layer; and
   a first conductive strip disposed on the side of the dielectric layer opposite the first conductive layer and electrically connected to the probe tip for conveying microwave signals.

15. A microscope, comprising
   a probe tip;
   a cantilever arm supported near its proximal end by an actuator positioned near the proximal end, and supporting the probe tip on its distal end;
   a source of microwave signal coupled to the probe tip and interacting with a sample adjacent the probe tip;

a low-frequency oscillatory source producing a vertical oscillation signal of vertical oscillation frequency lower than that of the microwave source;

an actuator controlled according the vertical oscillation signal and controlling a vertical motion of the probe tip perpendicular to a sample surface; and a control system receiving and electrically interacting microwave radiation reflected from the sample with an electrical signal of vertical oscillation frequency from the low-frequency source for producing a differential of the received microwave radiation relative to at least two vertical separations of the probe tip from the sample surface.

16. The microscope of claim 15, further comprising means for determining a height of the tip above the sample according to the shape of a curve relating capacitance to the height and accordingly to control the height through the actuator.

17. A probe tip for use in a microwave microscope, comprising:

a mount;

a cantilever flexible in a vertical direction, supported on one end thereof by the mount, supporting on the other end thereof a probe tip projecting in the vertical direction from the cantilever, and including a transmission line carrying a microwave signal and extending along the cantilever between the probe tip to the mount, wherein the probe tips includes a body including a tapered section terminating in an apex, and a semiconductor barrier disposed in the body and across which the microwave signal passes.

18. The probe tip of claim 17, wherein the body comprises a semiconductor body and a metallic layer is formed at the surface of the tapered section to form a Schottky junction across which passes the microwave signal.

19. The probe tip of claim 17, wherein the tapered portion includes an inner portion of a first semiconductivity type and a layer of a second semiconductivity type is formed over the inner portion to form a p-n junction through which passes the microwave signal.

20. The probe tip of claim 17, wherein the body is formed of a first semiconductivity type and a base of the body is disposed in a well of a second semiconductivity type, wherein the well has a modulatable conduction channel underlying the base, connecting source and drain electrodes of the well, and through which passes the microwave signal.

21. A method of operating a microscope, comprising the steps of:

coupling a microwave excitation signal at a microwave frequency of greater than 100 MHz through a probe tip onto a localized area of a sample;

modulating the coupling of the excitation signal according to a modulation signal at a modulation frequency of less then 10% of the microwave frequency;

detecting a reflected microwave signal from the sample resulting from the excitation signal; and demodulating the reflected microwave signal resulting from the microwave excitation signal according to the modulation signal.

22. The method of claim 21, wherein the probe tip is located on a distal end of a flexible cantilever and the modulating step vertically oscillates a distal end of the cantilever above the localized area according to the modulation signal at the modulation frequency of no more than 300 kHz.

23. The microscope of claim 15, wherein the control system produces signals referenced respectively to the in-phase and out-phase components of the microwave signal.

24. The probe of claim 1, wherein the first and second conductive layers are connected together.

25. The probe of claim 1, wherein the first and second conductive layers are connected together to ground.

26. The microscope of claim 16, wherein the height is determined by monitoring capacitance while an experimental height of the tip above the sample is oscillated about a central height.

* * * * *

UNITED STATES PATENT AND TRADEMARK OFFICE
CERTIFICATE OF CORRECTION

Page 1 of 1

PATENT NO. : 8,266,718 B2
APPLICATION NO. : 12/706190
DATED : September 11, 2012
INVENTOR(S) : Lai et al.

It is certified that error appears in the above-identified patent and that said Letters Patent is hereby corrected as shown below:

In the Specifications

Column 1, line 16 should read:
This invention was made with Government support under contract DE-AC03-76SF-00515 awarded by the Department of Energy and grant 042589 awarded by the National Science Foundation. The Government has certain rights in this invention.

Signed and Sealed this
Seventh Day of January, 2014

Margaret A. Focarino
*Commissioner for Patents of the United States Patent and Trademark Office*